(No Model.)

W. W. BANKS & J. IRWIN.
MACHINE FOR FORMING DOUGH FOR BRETZELS.

No. 342,559. Patented May 25, 1886.

WITNESSES:

INVENTOR

UNITED STATES PATENT OFFICE.

WILLIAM W. BANKS, OF POTTSTOWN, AND JAMES IRWIN, OF NORTH COVENTRY, PENNSYLVANIA.

MACHINE FOR FORMING DOUGH FOR BRETZELS.

SPECIFICATION forming part of Letters Patent No. 342,559, dated May 25, 1886.

Application filed September 29, 1885. Serial No. 178,501. (No model.)

*To all whom it may concern:*

Be it known that we, WILLIAM W. BANKS, residing in Pottstown, Montgomery county, and JAMES IRWIN, residing in North Coventry, Chester county, citizens of the United States, residing as aforesaid, in the counties aforesaid, and State of Pennsylvania, have invented certain new and useful Improvements in Machines for Forming Dough for Bretzels and Similar Articles; and we do hereby declare the following to be a full, clear, and exact description of the invention, such as will enable others skilled in the art to which it appertains to make and use the same.

Our invention relates to machines for cutting and shaping the dough for making bretzels; and the improvement consists in the construction and arrangement of the several parts parts of the machine, as will be hereinafter described, and more particularly pointed out in the claims.

Figures 1, 2:
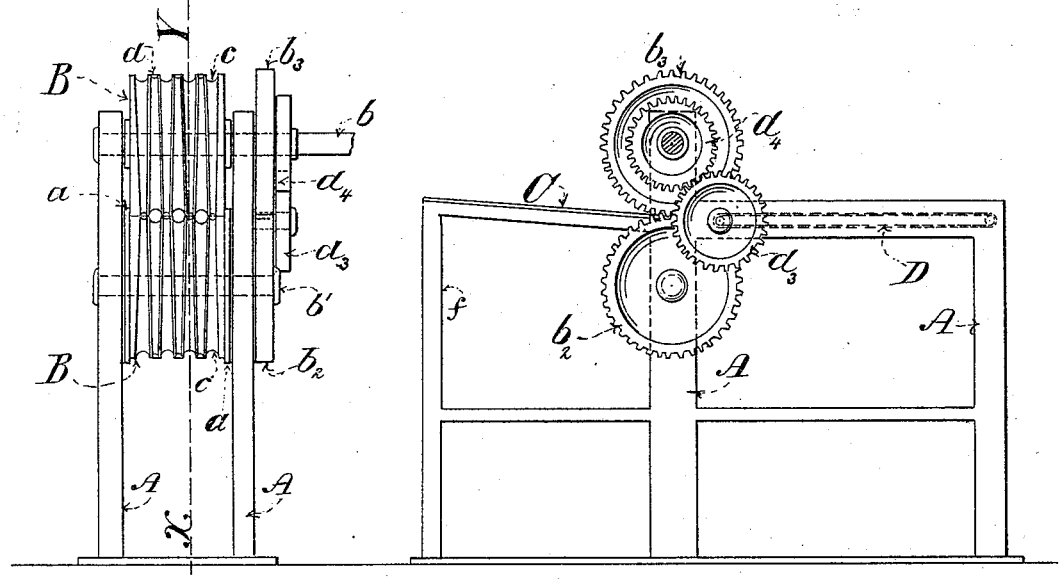
Figures 3, 4:
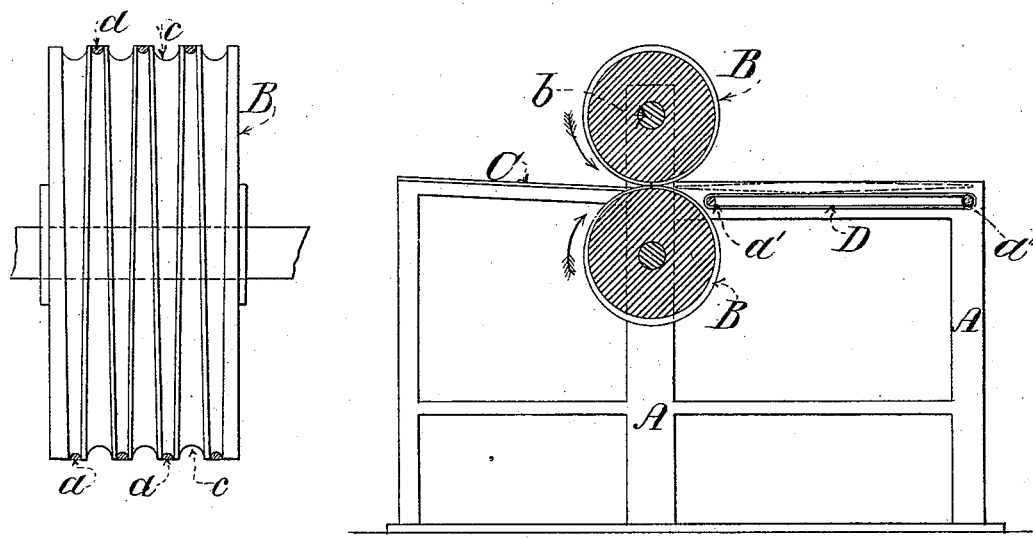

In the accompanying drawings, Figure 1 is an end elevation of our machine. Fig. 2 is a side elevation thereof. Fig. 3 is a sectional view of the machine on line X Y. Fig. 4 is an enlarged view of one of the taper fluted rollers.

A A represent the frame of the machine.

B B are two taper fluted rollers, located one above the other in the frame A.

$b$ is the shaft carrying the upper one of the fluted rollers. To this shaft the motive power (either hand or steam) for operating the machine is attached. $b'$ is the shaft carrying the bottom roller.

$c$ $c$ are tapering flutes extending around the rollers B B.

$d$ $d$ are knives secured in each of the flutes of both rollers at the narrowest parts of the said flutes.

$b^3$ is a cog-wheel on the shaft $b$.

$b^2$ is a similar cog-wheel on the shaft $b'$, and gearing into the cog-wheel $b^3$.

C is an inclined table in front of the rollers B B.

D is an endless revolving apron extending over the rollers $d'$, and $d''$ at the back of the fluted rollers.

$d^3$ is a cog-wheel on the end of the shaft carrying the roller $d'$, and gearing into the cog-wheel $d^4$ on the end of the driving-shaft $b$.

$a$ $a$ are flanges on either side of the bottom fluted roller. These flanges keep the rollers in position and prevent the dough from extending or being forced over the edges of the rollers. The flutes $c$ $c$ gradually widen and deepen from the smallest to the largest part thereof as they extend around the rollers B B, the smallest and largest parts of said flutes being at points exactly opposite to each other on both rollers. The fluted rollers B B are secured in the frame A in the position shown in Figs. 1 and 3, with the narrowest and widest parts of the flutes on one roller opposite to the corresponding parts of the other roller, and, as the cog-wheels $b^3$ and $b^2$ are of the same size and provided with the same number of teeth, this position will always be maintained, and the knives $d$ $d$ in the several flutes of the top roller will meet those in the bottom roller at regular intervals as the said rollers are revolved.

The machine being constructed as shown, the method of operating is as follows: The motive power is attached to the driving-shaft $b$, and the whole machine thus put in motion with the rollers B B revolving in the direction indicated by the arrows in Fig. 3. The prepared dough, which has been previously rolled into sheets of the proper size, is then placed on the inclined table C and pushed against the rollers B B, when it will pass between said rollers, going through the flutes $c$ $c$, and being cut at regular intervals by the contact of the knives $d$ $d$ in the upper and lower rollers. As the cut and molded strips pass from the rollers B B they are received upon the revolving apron D, from which they can readily be removed by hand. The dough-table C being inclined, the sheet of dough will be easily drawn through the rollers after they have once taken hold.

Having thus described our invention, what we claim as new, and desired to secure by Letters Patent of the United States, is—

1. In a machine for forming bretzels and like articles of dough, a pair of rolls mounted and working together substantially as described, having flutes therein which are tapered gradually in both directions from the smallest point to the largest, substantially as set forth.

2. In a machine for forming bretzels and like articles of dough, a pair of rolls mounted and working together, each roll having taper flutes therein formed so that the small part of one flute shall lie beside the large part of the flute next to it on the same roll, substantially as and for the purpose set forth.

3. In a machine for forming bretzels and like articles of dough, a pair of rolls mounted and working together substantially as described, said rolls having flutes therein which are tapered gradually in both directions from the smallest point to the largest, and having knives located in the smallest parts of said flutes, as set forth.

In testimony whereof we affix our signatures in presence of two witnesses.

WILLIAM W. BANKS.
JAMES IRWIN.

Witnesses:
J. H. BINDER,
L. H. DAVIS.